(12) United States Patent
Bond et al.

(10) Patent No.: US 10,659,510 B2
(45) Date of Patent: May 19, 2020

(54) SYSTEM AND METHOD FOR ACTIVE TRANSCODING OF CONTENT IN A DISTRIBUTED SYSTEM

(71) Applicant: INTERNATIONAL BUSINESS MACHINES CORPORATION, Armonk, NY (US)

(72) Inventors: Robert W. Bond, Powder Springs, GA (US); Stephen E. Jaffe, Canton, GA (US); Michael P. Outlaw, Dallas, GA (US); Matthew A. Terry, Celebration, FL (US); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 96 days.

(21) Appl. No.: 15/664,237

(22) Filed: Jul. 31, 2017

(65) Prior Publication Data
US 2017/0331873 A1 Nov. 16, 2017

Related U.S. Application Data

(63) Continuation of application No. 14/246,362, filed on Apr. 7, 2014, now Pat. No. 9,807,139, which is a
(Continued)

(51) Int. Cl.
*H04L 29/06* (2006.01)
*H04L 29/08* (2006.01)

(52) U.S. Cl.
CPC ........ *H04L 65/602* (2013.01); *H04L 67/1097* (2013.01); *H04L 69/22* (2013.01)

(58) Field of Classification Search
CPC .... H04L 65/602; H04L 67/1097; H04L 69/22
(Continued)

(56) References Cited

U.S. PATENT DOCUMENTS 6,487,663 B1 11/2002 Jaisimha et al.
6,671,807 B1 12/2003 Jaisimha et al.
(Continued)

FOREIGN PATENT DOCUMENTS

WO 03094446 11/2003

OTHER PUBLICATIONS

Anatasiadias, SV. et al. "Scalable and Fault-Tolerant Support for Variable Bit-Rate Data in the Exedra Streaming Server", ACM Transactions on Storage vol. 1. No. 4, Nov. 2005, pp. 419-456.
(Continued)

*Primary Examiner* — Kevin S Mai
(74) *Attorney, Agent, or Firm* — Isaac J. Gooshaw; Andrew M. Calderon; Roberts Calderon Safran & Cole, P.C.

(57) ABSTRACT

A system and method for streaming media and, more particularly, to a system and method for active transcoding of content in a distributed system. The method includes receiving a file having predetermined parameters and sizing the file up to an optimal packet size according to a logarithmic scheme. The optimal packet size is a largest packet size. In further aspects, the method also includes providing a computer infrastructure operable to perform the steps herein. The system includes a media service, rules engine, log based job creator and a stream constructor. A computer infrastructure having computer readable medium to perform the processes described herein is also provided.

17 Claims, 6 Drawing Sheets

Related U.S. Application Data continuation of application No. 11/847,855, filed on Aug. 30, 2007, now abandoned.

(58) Field of Classification Search
USPC .......................................................... 709/219
See application file for complete search history.

(56) References Cited

U.S. PATENT DOCUMENTS

| | | | |
|---|---|---|---|
| 6,862,278 B1* | 3/2005 | Chang | H04N 19/176 348/384.1 |
| 6,865,425 B2* | 3/2005 | McNutt | G05B 11/28 329/312 |
| 6,934,837 B1 | 8/2005 | Jaisimha et al. | |
| 7,224,703 B2 | 5/2007 | Antal et al. | |
| 2003/0018795 A1 | 1/2003 | Ebling et al. | |
| 2003/0163302 A1* | 8/2003 | Yin | G06F 17/2775 704/9 |
| 2004/0120256 A1 | 6/2004 | Park | |
| 2004/0196498 A1 | 10/2004 | Klassen | |
| 2005/0135433 A1 | 6/2005 | Chang et al. | |
| 2005/0213502 A1* | 9/2005 | Convertino | H04L 1/0014 370/229 |
| 2006/0020474 A1 | 1/2006 | Stewart et al. | |
| 2007/0115963 A1* | 5/2007 | Vadlakonda | H04L 29/06027 370/389 |
| 2007/0211682 A1* | 9/2007 | Kim | H04L 29/06027 370/338 |
| 2008/0181259 A1 | 7/2008 | Andreev et al. | |
| 2010/0079314 A1 | 4/2010 | Gonion | |

OTHER PUBLICATIONS

Ashmawi, W. et al., "On the Impact of Policing and Rate Guarantees in Diff-Serv Networks: A Video Streaming Application Perspective", SIGCOMM '01, Aug. 27-31, 2001, SanDiego, (Currently Amended), USA, Copyright 2001 ACM 1-58113-411-8/01/008 pp. 83-95.

Hefeeda, M. et al., "Promise: Peer-to-Peer Media Streaming Using CollectCast", MM '03, Nov. 2-8, 2003, Berkley, CA, USA, Copyright 2003 ACM 1-58113-722-2/030011, pp. 45-54.

Yoshimura, T. et al., "Mobile Streaming CDN Enabled by Dynamic SMIL", WWW2002, May 7-11, 2002, Honolulu, HI, USA, ACM 1-58113-449-5/02 10005., pp. 651-661.

Ding, Jen-Wen et al., Packet Permutation: A Robust Transmission Technique for Continuous Media Streaming Over the Internef, WWW2003, Dec. 2003, vol. 21, No. 3, pp. 281-305.

* cited by examiner

SYSTEM AND METHOD FOR ACTIVE TRANSCODING OF CONTENT IN A DISTRIBUTED SYSTEM

FIELD OF THE INVENTION

The invention generally relates to a system and method for streaming media and, more particularly, to a system and method for active transcoding of content in a distributed system.

BACKGROUND OF THE INVENTION

In view of advancing technologies, the delivery of digitized media content over a network to end user computers has become commonplace. The term "media" refers to any information, including audio, video, data, text, or other content. To provide such content, communication protocols define how the digitized media content is exchanged over the network.

Digital representations of media content come in different types. These types are defined according to variables which can include file format, bit rate, compression algorithm, and/or digital rights management information associated with the media content. The type of digitized media content will also depend upon a number of factors, such as, the computing and/or networking technology used in the process of publishing.

Digitized media content types can also be categorized according to the type of physical medium that supports the storage of the media content. Digitized media types may also be categorized by the communication protocol or protocols used to transmit the media content. For example, in packet-switched networks such as the Internet, many layers of protocols are used such as, for example, Internet Protocol (IP), Transmission Control Protocol (TCP), User Datagram Protocol (UDP), and Real-Time Transport Protocol (RTP).

Transcoders are used to convert certain types of media content (source type) to another type of media content (destination type). This conversion is known as "transcoding," which can involve a number of different conversion operations. Users incapable of accommodating the destination type of the transcoded files simply cannot access the content. As a result of the rapid development in media publishing technology, new internet and wireless device manufacturers must invest heavily in the transcoding of media content so that a variety of content can be experienced on new media playing devices as new destination types.

Conventional multi-type transcoding services are limited in that they can only divide media files into evenly split packets for processing, i.e., transcoding. For example, in a ten minute file that is 100 Mb, each minute of the file can only be partitioned into 10 Mb packets. Once the packets are equally divided, they are sent to the transcoder for processing. Such an even distribution, though, does not translate well to near real time. For example, in an on-demand transcoding environment, the system must wait for the first job to complete before informing the user that they can start streaming. In this case, as the transcoder works on a single job, this job must complete before a new job can enter the system. For this reason, it will take time (n) to process each job. Although this is acceptable in many circumstances, there may be circumstances where the results need to be streamed back to the client in a faster manner. This streaming could be a media stream, data stream or results for further/synchronized process.

Accordingly, there exists a need in the art to overcome the deficiencies and limitations described hereinabove.

SUMMARY OF THE INVENTION

In a first aspect of the invention, a method comprises receiving a file having predetermined parameters and sizing the file up to an optimal packet size according to a logarithmic scheme. The optimal packet size is a largest packet size.

In a second aspect of the invention, the method is provided for actively transcoding a file. The method comprises providing a computer infrastructure operable to: receive a file with predetermined parameters; size the file into different packet sizes up to an optimal packet size based on the predetermined parameters, with the optimal packet size being a largest packet size; and send the different packet sizes for processing, in a priority processing order of smallest to the optimal packet size.

In another aspect of the invention, a system comprises a media service, rules engine, log based job creator and a stream constructor. The media service is configured to receive a file with parameters. The rules engine is configured to store at least one encoding rule associated with the file. The log based job creator is configured to split the file into different packet sizes up to a maximum of an optimal packet size based on the encoding rules. The log based job creator can be overridden by a logarithm scheme provided by the file as one of the parameters. The stream constructor is configured to order a processed stream of data.

In yet another aspect of the invention, a computer infrastructure has a computer readable medium having a computer program executable to: size a file into different packets sizes based on a logarithmic scheme using predetermined parameters of the file, with an optimal size being a largest packet size; and send the different packet sizes for processing, in a priority processing order of smallest to the optimal size.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to a system and method for streaming media and, more particularly, to a system and method for active transcoding of content in a distributed system. In embodiments, the system and method is configured for use with an audio, video or audiovisual media file, as well as for text files. By implementing the invention, files to be transcoded can be divided into optimally sized data chunks (packets) using a logarithmic algorithm to enable faster transmission in a data stream. By way of illustrative example, the system and method of the invention is configured to divide an incoming file into smaller packets based on a logarithmic algorithm. As the smaller data packets are processed and streamed back to the user, the logarithmic algorithm continues to divide the data file into larger packets for processing, until an optimal size data packet is reached. In this way, it is possible to allow a user to view smaller packets of data while the larger packets are processing, i.e., stream the entire job faster, compared to conventional systems. In embodiments, the splitting of the file may be linked, for example, to the transcoding needs of the devices. The invention can be used over any distributed network, for example, as discussed in more detail below.

System Environment

Figure 1:
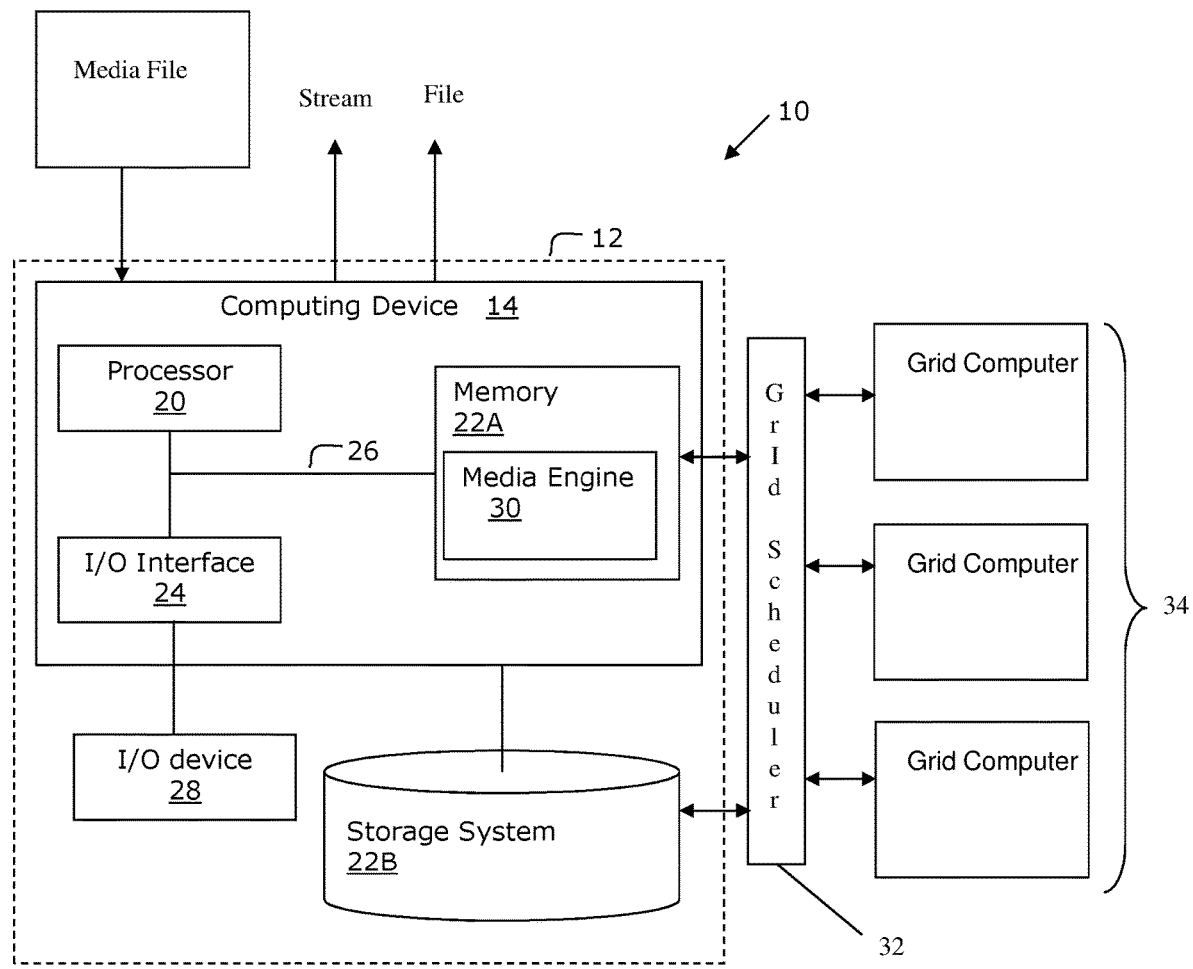
FIG. 1 shows an illustrative environment for implementing the processes in accordance with the invention.

FIG. 1 shows an illustrative environment 10 for managing the processes in accordance with the invention. The environment 10 includes a computer infrastructure 12 that can perform the processes described herein. In particular, the computer infrastructure 12 includes a computing device 14 that comprises a media engine 30. The media engine 30 makes computing device 14 operable to allow active transcoding of media (content) in a distributed computing system.

More specifically, the media engine 30 is configured to split content, e.g., audio, visual, audiovisual and text files (hereinafter referred generally as "media") into different sized packets (jobs), e.g., non-uniformly sized packets, for processing within a distributed grid transcoding environment 34. As should be understood by those of skill in the art, the distributed grid transcoding environment 34 includes one or more grid computers configured to transcode the media. The media engine can also provide the split media file to multiple transcoders in the distributed grid transcoding environment 34 to decrease streaming time.

In one implementation, the media engine 30 determines job loads based on a logarithmic scheme, e.g., Log(x)*n, where "n" represents an optimal packet size and "x" represents time. As should be understood, the optimal packet size can be different sizes depending on the capacity and processing capabilities of the grid computers within the distributed grid transcoding environment 34. As such, the logarithmic scheme implemented by the media engine 30 not only determines and apportions different sized packets, the media engine 30 also provides the optimal media size packet (or packets) for each grid computer of the grid transcoding environment 34. In this way, several media packets of the different packet sizes or the same packet sizes can be sent to one or more grid computers over a period of time, which equal or substantially equal the optimal size. As the smaller packet sizes are processed, larger sized packets can be prepared and processed, until a largest optimal size packet is processed in accordance with the invention. This allows the most efficient use of the grid computers. In another embodiment, the invention is used for text files in which the logarithmic based algorithm will determine a dividing of the file either at the periods or paragraph ends.

As the media engine 30 begins the chunking process, it will send each media packet to a grid scheduler 32. As the smaller packets are faster to process, the grid scheduler 32 will schedule the smaller jobs with top priority while the larger jobs can be scheduled later in the process. This increases response time of the streaming of the media by allowing the smaller packets to be viewed while the transcoding environment 34 is still processing the larger packets. In embodiments, the media engine will send a plurality of the different packet size, equal to or substantially equal to the calculated optimal size, over a period of time for processing. Once the packet size reaches optimal size, though, the media engine will then send only one optimal size packet per period of time for processes. However, if there is an interruption in the data stream, the media engine 30 can reduce packet size or number of packets in the data stream to better accommodate the grid computers of the grid transcoding environment 34.

Still referring to FIG. 1, the computing device 14 includes a processor 20, a memory 22A, an input/output (I/O) interface 24, a bus 26 and a user interface 32. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with the external I/O device/resource 28 and a storage system 22B. The grid scheduler 32 can communicate with the storage system 22B. The I/O device 28 can comprise any device, e.g., e keyboards, displays, pointing devices, etc., that enables an individual to interact with computing device 14 and/or any device that enables computing device 14 to communicate with one or more other computing devices using any type of communications link.

The processor 20 executes computer program code, which is stored in memory 22A and/or storage system 22B. As discussed herein, the computer program code executes the processes of the invention. While executing computer program code, the processor 20 can read and/or write data to/from memory 22A, storage system 22B, and/or I/O interface 24. The bus 26 provides a communications link between each of the components in computing device 14. Thus, computing device 14 shown in FIG. 1 may be provided on any distributed network.

The computing device 14 can comprise any general purpose-computing article of manufacture capable of executing computer program code installed thereon (e.g., a personal computer, server, handheld device, etc.). For the purposes of this description, the article of manufacture can be a computer-usable or computer readable medium that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, computer infrastructure 12 comprises two or more computing devices (e.g., a server cluster) that communicate over any type of communications link, such as a network, a shared memory, or the like, to perform the process described herein. Further, while performing the processes described herein, one or more computing devices in computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the processes of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Illustrative Embodiments of the Invention

Figure 2:
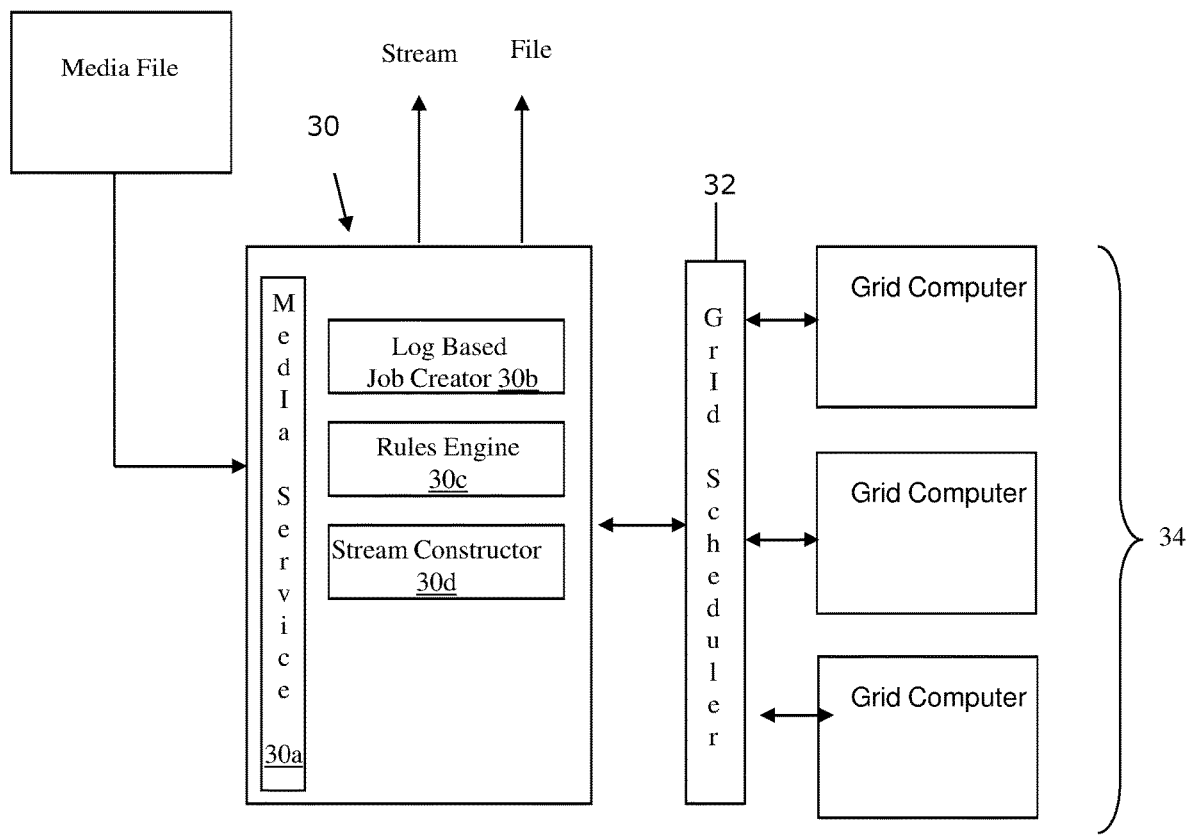
FIG. 2 shows an illustrative embodiment implementing the processes of the invention.

FIG. 2 shows an illustrative embodiment implementing the processes of the invention. In embodiments, the media engine 30 receives a media file to be transcoded. The media file may include the following parameters:
File Size;
Current File Format; and
Export Format.
In optional embodiments, the media file may include a desired logarithmic scheme and/or a scale. The scale can be represented as a scalar value of a per unit time measurement, as discussed in greater detail below.

The media engine 30 includes a media service 30a, a log based job creator 30b, a rules engine 30c and a stream constructor 30d. The media service 30a receives the media file, and searches for the current file size and file format. In further or alternative embodiments, the media service 30a may also check for compression rules and media cache to determine whether the job has already been encoded. If the job has not been encoded, the media service 30a can send the optimal job size, job splitting rule, current format, export format, bit-rate, compression algorithm, and the length of the media to the rules engine 30c for further processing.

Once the media service 30a determines the current file size and file format (e.g., current and export format), the media service 30a will use the export format and current format to look up in the rules engine 30c the encoding rule for the media file. The rules engine 30c, in embodiments, can also determine the stream rate, scale and resolution of the media file.

The rules engine 30c, using the information obtained from the media file, informs the log based job creator 30b of the optimal job size for encoding of the media file. The log based job creator 30b uses this information to determine the job scheduling (packet sizes) using the logarithmic scheme in accordance with the invention. That is, the log based job creator 30b will determine the different packet sizes based on the optimal packet size, taking into account the information of the media file as well as the configuration of the transcoding environment. In alternative embodiments, the media file may include the logarithmic scheme, which overrides the log based job creator 30b.

The media engine 30 determines an optimal size of the media file to be sent to the grid computers via the logarithmic scheme. The media engine 30 will begin to divide the media file into the different sized jobs using the logarithmic scheme. The smaller media job files which, in the aggregate, equal or substantially equal the optimal size can all be sent to the grid computers 34 for simultaneous processing. Thus, as should be understood and as an illustrative example, the media engine 30 determines an optimal size packet, e.g., 1000 k, and then begins to divide the media file into smaller packets, e.g., 10 packets of 100K, 20 packets of 50 k, etc. As the smaller packets equal the optimal size in aggregate, they can be sent to the grid computers for processing. In this case, each packet may be sent to a separate grid computer 34, simultaneously for processing. In an alternative scenario, as different grid computers have different processing capacities, it is contemplated that two or more of the smaller packets can be sent to the same grid computer, depending on its rated processing capacity. As the smaller packets are processed, the media engine 30 continues to divide the media file into larger and larger packets, e.g., 5 packets of 200 k, 2 packets of 500 k, until an optimal packet size, e.g., 1 packet of 1000 k, is reached.

The media engine 30 will stop the splitting into different sizes once an optimal size is reached for processing. As the media engine 30 divides the media file, the media files (in aggregate equaling or substantially equaling the optimal size) will be sent to the grid scheduler 32, where the smaller sized jobs will be processed prior to the larger sized jobs. This allows longer jobs to complete while smaller jobs are streamed back to the user. In embodiments, the packets of different sizes will be sent to the grid scheduler in such a manner that a plurality of different sized packets equaling the optimal size can be processed over a predetermined time period.

As the jobs are processed in the grid environment 34, the transcoded media will be sent back to the media engine 30 for ordering by the stream constructor 30d. As the processed jobs are ordered, they will be sent to the user. As shown in FIG. 2, audio, visual and/or audiovisual media are represented by the "stream" arrow, whereas, text files are represented by the "file" arrow".

Figure 3:
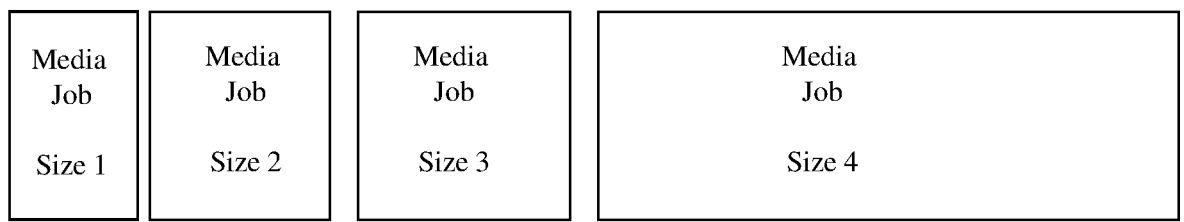
FIG. 3 shows a representation of different sized packets to be processed, in accordance with the invention.

FIG. 3 shows a representation of different sized packets of a single media file to be processed, in accordance with the invention. As shown, the media packets are of various sizes, with size "4" being the optimal size. As discussed above, the smaller sized packets will be processed prior to the larger sized packets (and optimal size) such that the smaller jobs can be streamed back to the user while the larger jobs are being processed, e.g., size 1, size 2, size 3, size 4. It should be understood that each different sized packets can be representative of a plurality of such sized packets such an optimal size is reached in an aggregate or combination of the different sized packets. In one example, a scenario can be envisioned in which size 1 and size 2 packets, combined, are an optimal size and are processed in the grid environment at the same time.

A code snippet implemented by the media engine 30, in accordance with the invention, can be represented as follows:

File Size
Current File Format
Export Format
(Optional) Log algorithm
(Optional) scale
<File Name="filename">
<Export>
</Export>
<Log>
</log>
</File>

Figure 4:
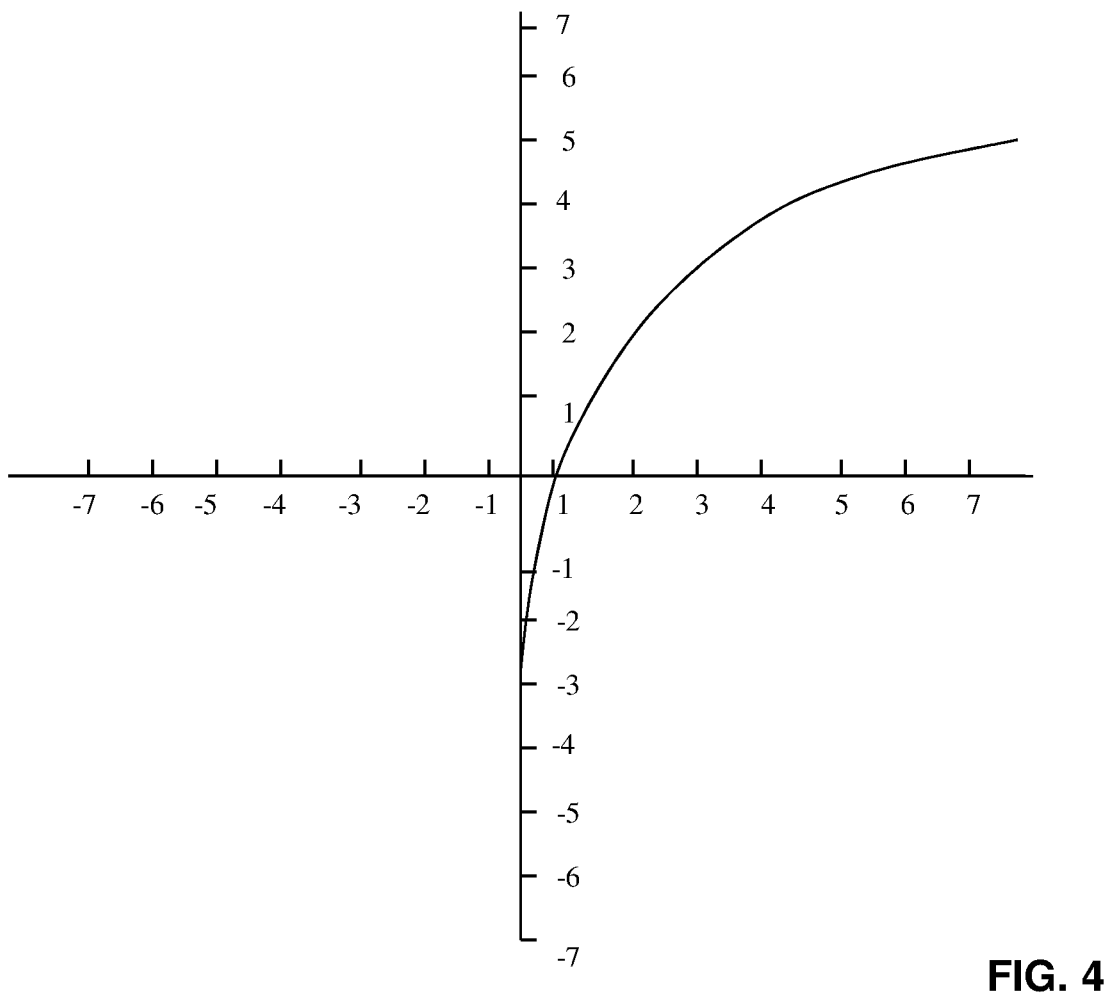
FIGS. 4 and 5 show graphical implementations of the logarithm scheme in accordance with the present invention.

FIG. 4 shows a graphical implementation of the logarithm scheme in accordance with the present invention. More specifically, FIG. 4 illustrates that over time (x-axis) it is possible to gradually increase the size of the job (y-axis) as jobs are put into the grid environment for processing. Also, in implementation, the graph of FIG. 4 may be used to determine the media packet sizes. It should be recognized that the graph of FIG. 4 is one illustrative example showing an implementation of the processes of the invention. Accordingly, it should be understood that the graph of FIG. 4 should not be considered a limiting feature of the invention and that other examples are contemplated by the invention.

In the graph of FIG. 4, the y-axis represents a job size in kilobytes and the x-axis represents time. In this example, the optimal job size is about 5 kbytes/sec, as shown by the plateau of the line corresponding to approximately 5 on the y-axis. In the logarithm scheme, this optimal size would be represented as $Log(x)*5$.

Graphically, FIG. 4 shows that the packet or job size of the media increases as time passes, until the optimal size is reached. As graphically shown, the objective is to start returning the first part of the data (media to be transcoded or data stream) as soon as possible and increase the length of jobs to maximize the streaming. Thus, instead of sending uniform sized jobs to the grid scheduler, the system and method of the invention creates smaller jobs at the start of the processing and larger, more uniform jobs as the processing approaches the end, until an optimal size is obtained.

Also, as can be represented in FIG. 4, a scale can be used for the x-axis to represent, in embodiments, a greater granularity to the system. In embodiments, the scale can be sent in or stored in the rules engine of FIG. 2. In one illustration, without any scale, each number on the x-axis represents a second. Using a scale, though, each of the numbers on the x-axis may represent a fraction of a second, providing for greater granularity. For example, in a scale of 0.5, ½ steps on the x-axis will represent every second.

Using the graph of FIG. 4 to determine the media packet sizes, in the example of a scale of 0.5, at one second, i.e., 0.5 on the x-axis, the resultant packet size is approximately 0.5 kbytes/sec. Thus, in the example using an optimal size of $Log(x)*5$, at one second (represented as 0.5 on the x-axis), the size of the packet is 1/10 of the optimal size of 5 kbytes/sec. (represented as 0.5 on the y-axis). As this is the case, then the packet size to send to the distributed grid at one second is 1/10 of 5 or 0.5 kilobytes. In this case, a total of 10 jobs can be sent in the first second. This same process can be used for the $2^{nd}$, $3^{rd}$, etc. second, until the total job is sent to the distributed grid for transcoding. In this manner, a plurality of the different packet sizes over a period of time can be sent for processing, which is equal the optimal size.

Figure 5:
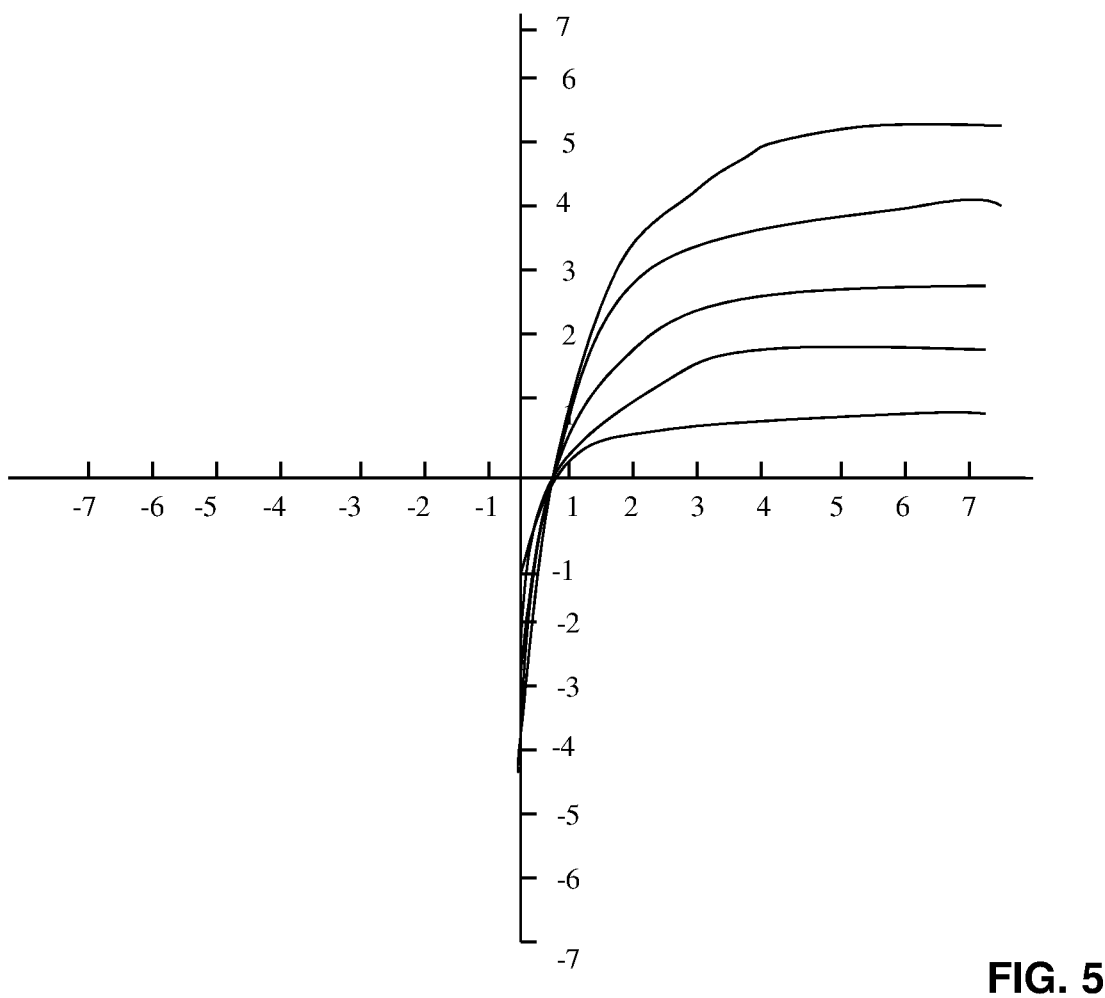

FIG. 5 shows a graphical implementation of the logarithm scheme in accordance with the present invention. In this example, FIG. 5 demonstrates $log(x)$, $log(x)*2 \ldots log(x)*5$. Similar to FIG. 4, FIG. 5 illustrates that over time (x-axis) it is possible to gradually increase the size of the job (y-axis) as jobs are put into the grid environment for processing. The graph of FIG. 5 can also be used to determine overall job sizing in accordance with the invention.

In the example of FIG. 5, the optimal job size varies depending on the designated optimal size "n" in $log(x)*n$. As shown in FIG. 5, if the user has a project of seven seconds, FIG. 5 graphically shows how varying the logarithm allows the user to manually vary the packet size across the system. For example, in a 1 k optimal packet size, the representation of the equation is $log(x)$, in a 5 k optimal packet size representation of the equation is $log(x)*5$. In the example of FIG. 5, the packets for the 5 k example can be divided into a first packet of 2 k, a second packet of 3 k, etc. until it reaches 5 k. This similar procedure can be used for the optimal size of 1 k, 2 k, 3 k and 4 k example, using the processes described herein.

Illustrative Example

Figure 6:
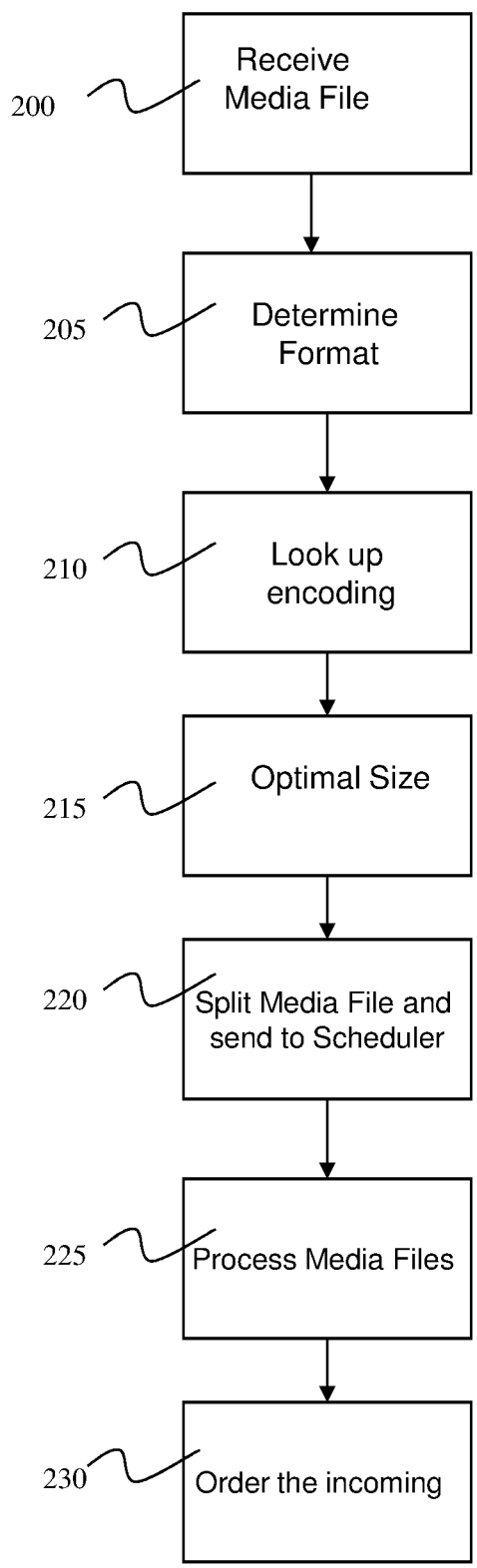
FIG. 6 shows a flow diagram implementing processes in accordance with the invention.

FIG. 6 is an illustrative example implementing processes of the invention, which may be implemented in the environment of FIG. 1 or FIG. 2. The process of FIG. 6 may be implemented and executed from either a server, in a client server relationship, or they may run on a user workstation. Additionally, the invention can be implemented in an entirely hardware embodiment, an entirely software embodiment or an embodiment containing both hardware and software elements. In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system, as discussed above.

In FIG. 6, at step 200, the media engine receives a media file from the user. The media file may be visual, audio, audiovisual or text. At step 205, the media engine determines the current and export format of the file and provides this information to the rules engine. At step 210, the rules engine looks up the encoding rule for the file. The rules engine 30c, in embodiments, can also determine the stream rate, scale and resolution of the media file. At step 215, the rules engine 30c informs the log based job creator of the optimal job size for encoding of the media file. At step 220, the log based job creator 30b uses this information to determine the job scheduling (packet sizes) using the logarithmic scheme in accordance with the invention. That is, the media will be divided according to the logarithmic scheme, and sent to the grid scheduler for processing within the grid environment.

As the smaller packets are processed, they will be sent back to the media engine, and more specifically ordered in the stream constructor, at step 225. At step 230, as the processed jobs are ordered, they will be sent to the user. The processes continue until all of the media is processed and sent back to the user, from preferably smallest job size to the largest, optimal job size.

While the invention has been described in terms of embodiments, those skilled in the art will recognize that the invention can be practiced with modifications and in the spirit and scope of the appended claims.

What is claimed is:

1. A method, comprising:
dividing a file into different-sized packets based on a logarithmic scheme, wherein:
sizes of the different-sized packets are up to an optimal packet size;
the optimal packet size is a largest packet size determined based on a capacity and a transcoding capability of a grid computer;
sending an aggregate of the different-sized packets to a plurality of grid computers that include the grid computer such that each of the different sized-packets are sent to a separate grid computer of the plurality of grid computers only when the aggregate of the different-sized packets are equal to the optimal packet size, to be processed simultaneously by the plurality of grid computers;
increasing the sizes of the different-sized packets based on the logarithmic scheme;
processing smaller different-sized packets prior to processing larger different-sized packets as determined by the dividing step; and
streaming processed smaller different-sized packets to a user while the larger different-sized packets are being processed,
wherein the processing of the larger different-sized packets comprises transcoding the different-sized packets from one type of media content to another type of media content.

2. The method of claim 1, wherein the logarithmic scheme is defined as log(x)*n, where n is the optimal packet size, and x is a time.

3. The method of claim 1, wherein as the smaller different-sized packets are processed, the file is further divided into the larger different-sized packets for processing, until the optimal packet size is reached and processed.

4. The method of claim 1, wherein the smaller different-sized packets are provided with priority processing while the larger different-sized packets are scheduled later, thereby increasing response time of streaming of media.

5. The method of claim 1, wherein the dividing of the file is based on at least the optimal packet size and the dividing includes dividing the file into packets of a same size, but smaller than the optimal size and an aggregate amount of the size packets can be processed simultaneously.

6. The method of claim 1, wherein:
the file is a text file; and
the logarithmic scheme determines a size of the text file based on one of periods or paragraph ends.

7. The method of claim 1, further comprising providing a scaling factor of the file.

8. The method of claim 1, wherein the file is at least one of an audio, visual, audiovisual and text file.

9. The method of claim 1, wherein the dividing divides the file into different sized packets, which increase in size as time passes, until the optimal packet size is reached.

10. The method of claim 1, further comprising reducing the sizes of the different-sized packets in response to an interruption of the processing of the smaller different-sized packets prior to processing the larger different-sized packets.

11. The method of claim 1, further comprising reducing a number of packets of the different-sized packets in response to an interruption of the processing of the smaller different-sized packets prior to processing the larger different-sized packets.

12. A system implemented in hardware, comprising:
a log based job creator configured to split a file into different-sized packets based on a logarithmic scheme provided by the file as one of the parameters, sizes of the different-sized packets being up to an optimal packet size, and the optimal packet size being a largest packet size determined based on a capacity and a transcoding capability of a grid computer;
sending an aggregate of the different-sized packets to a plurality of grid computers that include the grid computer such that each of the different sized-packets are sent to a separate grid computer of the plurality of grid computers only when the aggregate of the different-sized packets are equal to the optimal packet size, to be processed simultaneously by the plurality of grid computers;
increasing the sizes of the different-sized packets based on the logarithmic scheme;
processing smaller different-sized packets prior to processing larger different-sized packets as determined by the splitting step;
streaming processed smaller different-sized packets to a user while the larger different-sized packets are being processed,
wherein the processing of the larger different-sized packets comprises transcoding the different-sized packets from one type of media content to another type of media content.

13. A computer program product comprising a tangible computer readable hardware storage device having readable program code tangibly stored on the computer readable hardware storage device, the program code comprising:
program code to divide a file into different-sized packets based on a logarithmic scheme, with sizes of the different-sized packets being up to an optimal size, and the optimal size being a largest packet size determined based on a capacity and a transcoding capability of a grid computer;
program code to send an aggregate of the different-sized packets to a plurality of grid computers that include the grid computer such that each of the different sized-packets are sent to a separate grid computer of the plurality of grid computers only when the aggregate of the different-sized packets are equal to the optimal packet size, to be processed simultaneously by the plurality of grid computers;
program code to increase the sizes of the different-sized packets based on the logarithmic scheme;
program code to process smaller different-sized packets prior to processing larger different-sized packets as determined by the dividing step; and
program code to stream processed smaller different-sized packets to a user while the larger different-sized packets are being processed,
wherein the processing of the larger different-sized packets comprises transcoding the different-sized packets from one type of media content to another type of media content.

14. The method of claim 1, further comprising sending at least two of the smaller different-sized packets to a same grid computer based on a rated processing capacity of the at least two of the smaller different-sized packets.

15. The method of claim 14, wherein the file comprises a plurality of parameters including a file size, a current file format, an export format, and a desired logarithmic scheme and scale.

16. The method of claim 15, further comprising determining an encoding rule for the file based on the file size, the current file format, and the export format.

17. The method of claim 16, further comprising determining a stream rate, a scale, and a resolution for the file based on the file size, the current file format, and the export format.

* * * * *